No. 764,965. PATENTED JULY 12, 1904.
E. A. TOUSLEY.
HOTHOUSE VENTILATOR.
APPLICATION FILED JAN. 8, 1903.
NO MODEL.
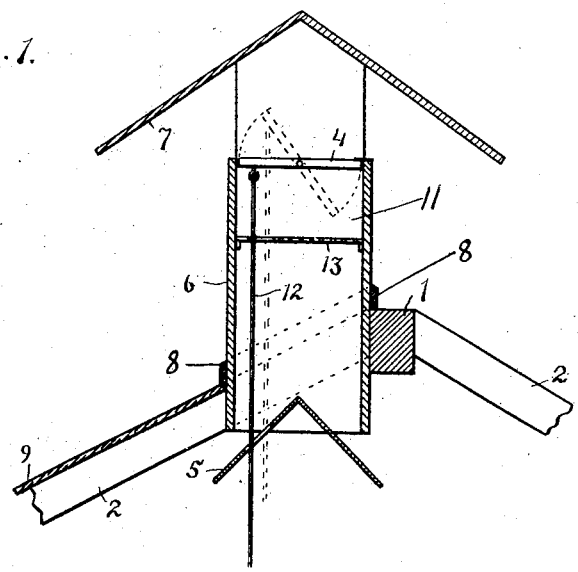
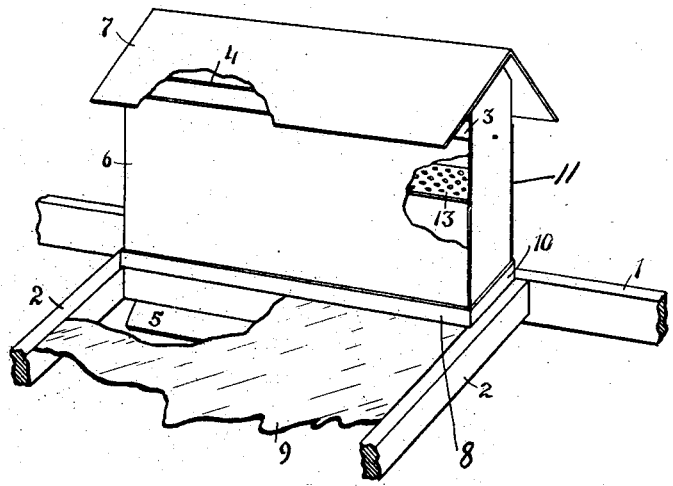
WITNESSES:
Edgar A. Tousley INVENTOR
BY Chapin & Denny
His ATTORNEYS.

No. 764,965. Patented July 12, 1904.

UNITED STATES PATENT OFFICE.

EDGAR A. TOUSLEY, OF FORT WAYNE, INDIANA, ASSIGNOR OF ONE-HALF TO WALTER LANGTRY, OF FORT WAYNE, INDIANA.

HOTHOUSE-VENTILATOR.

SPECIFICATION forming part of Letters Patent No. 764,965, dated July 12, 1904.

Application filed January 8, 1903. Serial No. 138,194. (No model.)

*To all whom it may concern:*

Be it known that I, EDGAR A. TOUSLEY, a citizen of the United States, residing at Fort Wayne, in the county of Allen, in the State of Indiana, have invented certain new and useful Improvements in Ventilators for Hothouses and Greenhouses; and I do hereby declare that the following is a full, clear, and exact description of the invention, which will enable others skilled in the art to which it appertains to make and use the same, reference being had to the accompanying drawings, which form part of this specification.

My invention relates to improvements in ventilators for hothouses and greenhouses.

It is well known that the ordinary manner of ventilating hothouses and greenhouses is by lifting or raising the sash near the ridgepole in the top of the house, thereby frequently chilling and injuring the more tender plants, particularly in cold weather, by the direct draft thus thrown thereon.

The object of my present invention is to provide an improved means for ventilating such houses without raising any sash and so arranged that the incoming cold draft is not only broken up and distributed, but the temperature thereof is so modified during its passage or entrance into the house as to freely come into contact with the contents of the house without danger of injuring the same. This object I accomplish by the mechanism illustrated in the accompanying drawings, in which—

Figure 1 is a cross-section of my improvement in position upon the roof of a greenhouse, showing the relative arrangement of the operative parts with the pivoted door in dotted outline in its open position. Fig. 2 is a perspective of the same, showing the means for deflecting and distributing the draft upon its entrance.

Similar reference-numerals indicate like parts in both views.

My invention is made of any suitable material and of any desired proportions; and it consists of an upright frame 6, preferably about fourteen inches in length by about two and one-half inches in width and about eight inches in height, rigidly fixed to one side of the ridge-pole 1 and between the rafters 2 in any proper manner, having opposite lateral openings 3, a pivoted horizontal door 4 in the top thereof and immediately below the said lateral opening, and a deflector 5, rigidly fixed directly beneath the open bottom of the frame 6 and of the same length thereof.

While the frame 6 is preferably of the size above described, it may, if desired, be the full length of the ridge-pole 1, is open at both top and bottom, and has a roof 7, which sufficiently overhangs the sides of the said frame 6 to prevent the entrance of rain or snow through the lateral openings 3.

The frame 6 is preferably provided with the lateral flanges 8, which rest upon the ridge-pole 1 and the glass 9, respectively, and is provided with end cleats or flanges 10, which rest upon the respective rafters 2.

In the upper part of the frame 6 and immediately below the lateral openings 3 is arranged a horizontal door 4, pivoted at its ends in the ends 11 of the frame 6 and when closed excludes the admission of any draft whatever, but which can be conveniently opened to any degree desired by means of the pendent operating-rod 12, whose lower end is within easy reach of the operator. When the frame 6 is the full length of the ridge-pole, the door 4 should be made in suitable sections for convenience of manipulating.

At a suitable point below the door 4 and within the frame 6 is rigidly fixed a horizontal plate or diaphragm 13, which extends the full length of the said frame and is vertically perforated for the admission of the cool draft entering through the opened door 4 and is vertically slotted for the rod 12.

Directly below and partly within the open bottom of the frame 6 is rigidly fixed in any proper manner the inverted-V-shaped deflector 5, which extends the full length of the said frame and has its apex midway of the sides thereof, as shown in Fig. 1, thereby dividing the incoming cold draft and distributing it through the heated air in the apex of the roof, and thus materially modifying its temperature before it can descend to the plants below. It will also be noted that the deflector 5 is so positioned that the apex thereof projects upwardly into the lower end of the frame 6, but not sufficiently far to entirely close said end. This is for the purpose of providing separated air-passages at each side of the frame 6, and thereby insure the incoming air dividing and separating into oppositely-discharging currents.

It is thus seen that the present method of ventilating green and hot houses by raising a roof-sash is obviated by the use of my present invention, in which the incoming cold draft is first checked and broken up by its passage through a perforated plate arranged across its path and then divided, deflected, and distributed through the most highly heated body of air in the house before it can reach the plants below, thereby utilizing the heat of this body of air to correspondingly raise the temperature of the incoming cold air instead of permitting the heat of this body of warm air to escape and be wasted, as at present is the case.

Obviously the details of construction of my invention may be modified without departing from the spirit and scope thereof, which consists in providing a conduit at or near the ridge-pole, in which the admission of air can be regulated at pleasure and in which the incoming draft is checked, broken up, divided, deflected, and distributed through the body of heated air beneath the ridge-pole, thereby more completely utilizing the heat of such body of air to raise and modify the temperature of the incoming draft before it reaches the lower portion of the house and chills the contents thereof, as described.

While my invention is operative without the use of the deflector 5 or of the perforated plate 13, its efficiency is greatly increased by their employment.

Having thus described my invention and the manner of employing the same, what I desire to secure by Letters Patent is—

In a ventilator of the class described, the combination with an upright conduit having a roof thereon and provided beneath the latter and at the top of the conduit with lateral draft-openings, of a door pivotally mounted in said conduit at the upper portion thereof, a perforated diaphragm arranged beneath said door for checking and breaking up the incoming cold air, an inverted -V-shaped deflector arranged in the lower end of said conduit and extending throughout the length thereof for dividing and distributing the cold air in its passage from said conduit, the apex of said deflector projecting upwardly into the conduit to provide separated air-passages at each side of said conduit and thereby insure the incoming air dividing and separating into oppositely-discharging currents, and an operating device depending from said door and passing through said diaphragm and deflector, whereby said door may be opened and closed.

Signed by me at Fort Wayne, Allen county, State of Indiana, this 2d day of January, A. D. 1903.

EDGAR A. TOUSLEY.

Witnesses:
AUGUSTA VIBERG,
LULU BULMAHN.